United States Patent [19]

Rapp et al.

[11] 4,309,908
[45] Jan. 12, 1982

[54] LIQUID FILLED PRESSURE TRANSDUCER

[75] Inventors: Christoph Rapp, Griesheim; Karl Mikulecki, Darmstadt, both of Fed. Rep. of Germany

[73] Assignee: Hottinger Baldwin Measurements, Inc., Framingham, Mass.

[21] Appl. No.: 167,238

[22] Filed: Jul. 10, 1980

[30] Foreign Application Priority Data

Sep. 1, 1979 [DE] Fed. Rep. of Germany ....... 2935476

[51] Int. Cl.³ .............................................. G01L 9/04
[52] U.S. Cl. ........................................ 73/720; 73/706
[58] Field of Search ................. 73/720, 721, 715, 716, 73/717, 718, 719, 721, 722, 723–729, 706; 92/48, 98 R, 99

[56] References Cited

U.S. PATENT DOCUMENTS 3,353,410  11/1967  Mac Neil ............................. 73/715
3,400,908  9/1968  Bauer ..................................... 92/99
4,006,640  2/1977  Gealt ..................................... 73/720
4,161,887  7/1979  Stone et al. ........................... 73/720

*Primary Examiner*—Donald O. Woodiel
*Attorney, Agent, or Firm*—W. G. Fasse; D. F. Gould

[57] ABSTRACT

A liquid filled pressure pick-up or transducer comprises a housing, as strain gage sensor is supported in a liquid filled cavity in the housing and a membrane extends across an opening in the housing. A force transmitting rod connects the membrane to the strain gage sensor. In order to avoid damage especially to the membrane by extreme excess pressures, a plastically deformable support member acting as a stop is operatively held in the housing substantially in parallel to the membrane whereby the rod extends with play through the support member. An elastic seal extends around the rod hole in the support member toward the membrane. A substantially mirror symmetrical arrangement of two membranes and two support members results in a differential pressure transducer.

9 Claims, 1 Drawing Figure

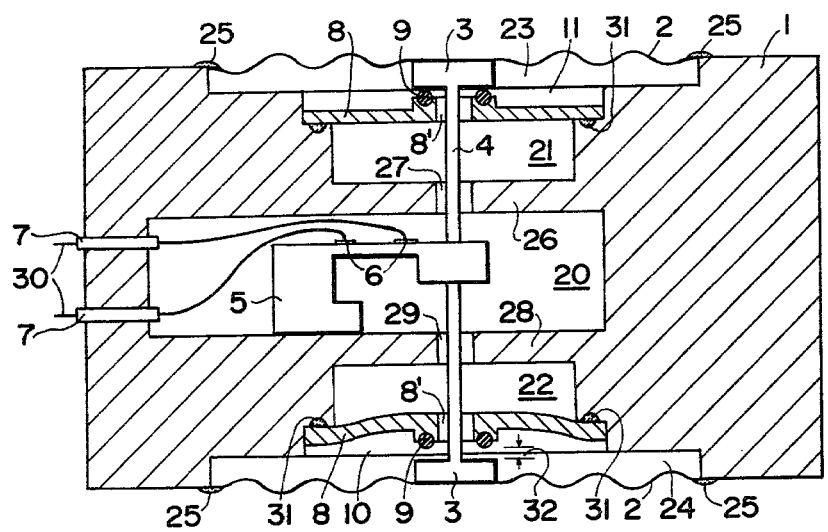

LIQUID FILLED PRESSURE TRANSDUCER

BACKGROUND OF THE INVENTION

The present invention relates to a liquid filled pressure transducer or pick-up particularly to a differential pressure pick-up or transducer having a housing and membrane means sealing an inner cavity inside the housing relative to the medium, the pressure of which is to be measured. In case of the differential transducer, two membranes are provided. The membrane or, in case of the differential pressure transducer both membranes, is provided with a reinforced center portion which is connected through a force transmitting rod to a force sensor such as a strain gage bending beam. Stop means may be provided for limiting the excursion of the force sensor. The invention also relates to a method for producing a pressure transducer, especially a differential pressure transducer so as to make these transducers less sensitive to overload.

A differential pressure transducer of the type described above is, for example, disclosed in an advertizing leaflet number PPD-101, May 1973, produced by the firm Statham of 2230 Statham Boulevard, Oxward Calif., 93030. A substantial disadvantage of this type of prior art differential pressure transducer or pick-up is seen in that frequently it is not useable any more after the occurrence of an extremely excessive pressure which exceeds the measuring range of such transducers.

OBJECTS OF THE INVENTION

In view of the above it is the aim of the invention to achieve the following objects singly or in combination:

to provide a pressure pick-up or transducer, especially a differential pressure pick-up or transducer, which combines a high measuring sensitivity with the simultaneous ability to withstand extremely high overloads without losing its operability;

to provide a method for producing such a pick-up or transducer; and to provide a pressure pick-up or transducer with a measuring range of 0 to 0.1 bar which may be overloaded with excess pressure up to 300 bar without losing its operability.

SUMMARY OF THE INVENTION

According to the invention there is provided a pressure transducer or pick-up in which between a membrane and a force sensor such as a strain gage bending beam there is arranged a plastically or permanently deformable stop member secured to the transducer housing in a sealing manner. A force transmitting member such as a rod operatively connects the membrane and the force sensor and extends with play, free of friction, through the deformable stop member. Elastic sealing means are operatively located between the deformable stop member and a central portion of the membrane. Preferably, the central portion of the membrane is formed as a sealing surface, whereby the passage through the stop member may be sealed so that upon the initial application of an excess external pressure, the stop member may be plastically, permanently defomed into an operating position in which it may function as a stop member.

It has been found that a transducer having the above features and constructed for a measuring range, for example from 0.0 to 0.1 bar, may be exposed to an excess pressure of up to 300 bar without losing its operability.

The present transducers or pick-ups may be advantageously produced by a method which is characterized in that the central portion of the membrane or membranes and the deformable stop member or stop members are initially so located that they abut each other and that after the assembly of the components the deformable stop member or members is plastically, permanently deformed by means of a preselectable excess pressure. Preferably, the preselected excess pressure exceeds the maximum permissable excess pressure to which the transducer may be exposed in operation. It is an advantage of this production method that the transducer cannot be accidentally damaged during its production because during most of the assembly operation the center portion of the membrane or membranes rests against the deformable stop member which is deformed only during the last step of manufacturing. As mentioned, the pressure transducer or differential pressure transducer according to the invention is substantially more nonsensitive to manufacturing tolerances than comparable transducers of the prior art.

BRIEF FIGURE DESCRIPTION

In order that the invention may be clearly understood, it will now be described, by way of example, with reference to the single FIGURE which illustrates a sectional view through a differential pressure transducer or pick-up according to the invention.

DETAILED DESCRIPTION OF A PREFERRED EXAMPLE EMBODIMENT AND OF THE BEST MODE OF THE INVENTION

The single FIGURE illustrates a sectional view through a differential pressure transducer or pick-up. The upper portion of the illustration shows the stop member according to the invention still in its nondeformed state. The lower portion shows the stop member in the deformed state. The housing 1 is provided with a central cavity or chamber 20 and axially aligned holes 21 and 22. Initially, the hole 21 opens into a recess 23. Similarly, the hole 22 initially opens into a recess 24. Both recesses 23, 24 are closed by a respective pressure sensing membrane 2 made, for example, of sufficiently flexible steel. The membranes 2 are secured to the housing 1, for example, by welding seams 25. The central chamber 20 is preferably separated from the hole 21 by a wall 26 provided with a throttling opening 27 operatively interconnecting the chamber 20 and the hole 21. Similarly, the hole 22 is separated from the chamber 20 by a wall 28 provided with a throttling opening 29 operatively interconnecting the hole 22 with the chamber 20. The chamber 20, the holes 21, 22, and the recesses 23, 24 are normally filled with a suitable liquid such as oil or the like.

The membranes 2 face the medium, the pressure of which is to be measured. Each membrane is provided with a central portion 3, the inwardly facing surface of which constitutes a sealing surface. Additionally, the central portion 3 provides a reinforcement for the respective membrane. The inner plane surface of the center portion 3 is connected to a force sensor 5, such as a bending beam sensor equipped with foil strain gages 6 operatively connected through conductors to output terminals 30 extending through respective insulating and sealing lead-in bushings 7. The operative connection between the central portion 3 of each membrane 2 and the force sensor 5 is accomplished, for example, by a central rod 4 extending with play and without friction through the passages 27 and 29.

A permanently or plastically deformable stop member 8 is secured to the housing 1 by welding seams 31 to substantially cover the respective hole 21, or 22. Each stop member 8 is provided with a passage 8' through which the force transmitting rod 4 extends. Further, each deformable member 8 comprises a sealing surface facing toward the central portion 3 of the respective membrane 2 and equipped with a sealing member 9 such as an O-ring which is elastically deformable.

According to the invention the housing 1 and the stop member 8 are initially so dimensioned that the inwardly facing surface of the central membrane portion 3 abuts against the respective deformable member 8, or rather, against the respective O-ring 9. This is illustrated in the top part portion of the FIGURE.

As mentioned, the inside cavities in the housing 1 are filled with an electrically nonconducting liquid, for example a silicone oil.

Upon completion of the pick-up or transducer to the extent shown in the upper part of the FIGURE, each of the membranes 2 is sequentially exposed to a preselectable pressure which exceeds the maximum permissible excess pressure for the particular type of transducer. The exceeding pressure is large enough to plastically deform the stop member 8 to such an extent that the force sensor 5 may be deflected to the maximum permissible extent.

Due to this plastic deformation of the stop member 8 a gap 32 is formed between the membrane portion 3 and the stop member 8, said gap having such a defined width that the stop member 8 performs its function in operation of the transducer so that the force sensor 5 and thus the respective membrane 2 are limited in their excursion to the maximally permissible extent.

During the normal operation of the differential pressure transducer that membrane 2 which faces the excess pressure medium is deformed inwardly. Since the liquid filling the internal cavities of the housing 1 is substantially noncompressible, the liquid present in the space 10 which includes the recess 24 between the membrane 2 and the stop member 8 must flow out of this space 10. This is possible due to the passage 8' and due to the gap 32 resulting from the plastic deformation of the member 8. The passage 8' is so dimensioned that the rod 4 may pass with play and without friction through the passage 8'. Due to the further passages 27 and 29, as well as the upper passage 8' the liquid may pass all the way into the space 11 which includes the recess 23 between the upper membrane 2 and the upper stop member 8. As soon as the rated pressure of the differential pressure transducer is reached, the central portion 3 of the membrane 2 abuts against the stop member 8. Simultaneously the space 10 is sealed against the other spaces or cavities inside the housing 1 by the elastic sealing means 9 so that the liquid filling remaining in the space 10 supports the membrane 2. In this manner it is avoided that the membrane 2 is plastically deformed or even destroyed if the excess pressure should be further increased.

As soon as the pressure effective on the lower membrane 2 for example, falls below the rated pressure, the free gap 32 is again opened between the central portion 3 and the stop member 8 so that the liquid filling may again be displaced and the differential pressure transducer is able to operate within the range of rated pressures without any trouble. It has been found in practice that the differential pressure according to the invention having, for example, a rated pressure range of 0.0 to 0.1 bar may be exposed on any one of its outwardly facing membranes to an excess pressure exceeding 300 bar without damaging the differential pressure transducer.

The above described teaching which was explained with reference to a differential pressure transducer, may be applied to a regular pressure transducer having only one membrane without departing from the present invention.

Incidentally, the stop member 8 may be made, for example, of steel.

Although the invention has been described with reference to specific example embodiments, it will be appreciated, that it is intended, to cover all modifications and equivalents within the scope of the appended claims.

What is claimed is:

1. A pressure transducer, comprising housing means, cavity means in said housing means filled with a liquid, sensor means operatively supported in said cavity means, opening means in said housing means, membrane means operatively secured to said housing means to close the opening means, force transmitting means operatively connecting said membrane means to said sensor means, output means (7) operatively connected to said sensor means, deformable stop means in said housing means and interposed between said sensor means and said membrane means, said deformable stop means having an aperture, said force transmitting means extending freely through said aperture of said deformable stop means, and elastic sealing means operatively interposed between said membrane means and said deformable stop means, whereby flow of liquid from a space between said membrane means and said stop means through said aperture may be prevented when said membrane means contact said elastic sealing means.

2. The transducer of claim 1, wherein said membrane means comprise a central reinforcing member (3) operatively connected to said force transmitting means, said elastic sealing means cooperating with said central reinforcing member.

3. The transducer of claim 1 or 2, further comprising welded securing means operatively fixing the position of said deformable stop means in said housing means.

4. The transducer of claim 1 or 2, wherein said elastic sealing means comprise an O-ring.

5. The transducer of claim 1, wherein said cavity means comprise a central chamber holding said sensor means, said opening means comprising two openings on opposite sides of said housing means, hole means communicating with said central chamber and interconnecting said two openings, said membrane means comprising two membranes each covering the respective one of said two openings, said deformable stop means comprising two stop members operatively arranged in said hole means substantially opposite the respective one of said two membranes, said force transmitting means operatively connecting said two membranes to said sensor means through said hole means and through said two stop members, whereby said transducer is capable of picking-up differential pressures.

6. The transducer of claim 5, further comprising wall means with throttling passages therein, said wall means separating said central chamber from said hole means, said force transmitting means extending through said throttling pasage means.

7. The transducer of claim 1 or 5, wherein said sensor means comprise a strain gage, bending beam sensor.

8. A method for making a liquid filled pressure transducer, especially a liquid filled differential pressure transducer, substantially insensitive to overloads, comprising the following steps: operatively assemblying the components of the transducer in a housing, said components including membrane means and at least one plastically deformable stop means, locating said membrane means and said stop means in such positions relative to each other that initially the membrane means and the stop means abut each other at least partially, and then applying a deforming pressure to the transducer, whereby said stop means are plastically deformed into an operating position for limiting the maximum excursion of said membrane means in response to excess operating pressures.

9. The method of claim 8, wherein said deforming pressure exceeds the maximum permissible operating pressure of said transducer.

* * * * *

UNITED STATES PATENT OFFICE
CERTIFICATE OF CORRECTION

Patent No. 4,309,908         Dated January 12, 1982

Inventor(s) Christoph Rapp et al

It is certified that error appears in the above-identified patent and that said Letters Patent are hereby corrected as shown below:

In the Abstract [57] in line 2, "a housing, as strain gage" should read -- a housing. A strain gage--;

In Claim 6, line 5, replace "pasage" by --passage--.

Signed and Sealed this

Sixth Day of April 1982

|SEAL|

*Attest:*

*Attesting Officer*

GERALD J. MOSSINGHOFF
*Commissioner of Patents and Trademarks*